United States Patent [19]

Lore et al.

[11] 4,127,711

[45] Nov. 28, 1978

[54] FLUORINE-CONTAINING TERPOLYMERS

[75] Inventors: Albert L. Lore; Stuart Raynolds, both of Wilmington, Del.

[73] Assignee: E. I. Du Pont de Nemours and Company, Wilmington, Del.

[21] Appl. No.: 783,456

[22] Filed: Mar. 31, 1977

[51] Int. Cl.² ................................................ C08F 214/18
[52] U.S. Cl. ...................................... 526/245; 526/243; 428/500
[58] Field of Search ................ 260/79.3 MU; 526/245

[56] References Cited

U.S. PATENT DOCUMENTS

| | | | |
|---|---|---|---|
| B 464,491 | 3/1976 | Pavlik et al. | 132/7 |
| 3,248,352 | 4/1966 | Marascia et al. | 260/28.5 |
| 3,282,905 | 11/1966 | Fasick et al. | 526/245 |
| 3,378,609 | 4/1968 | Fasick et al. | 260/890 |
| 3,491,169 | 1/1970 | Raynolds et al. | 526/245 |
| 3,530,215 | 9/1970 | Greif et al. | 424/70 |
| 3,547,856 | 12/1970 | Tandy | 526/245 |
| 3,645,990 | 2/1972 | Raynolds | 526/245 |
| 3,654,244 | 4/1972 | Pittman et al. | 526/245 |
| 3,717,679 | 2/1973 | Thompson et al. | 260/567.6 M |
| 3,838,104 | 9/1974 | Hayashi et al. | 526/245 |
| 3,842,054 | 10/1974 | Keim | 526/273 |
| 3,849,521 | 11/1974 | Kirimoto et al. | 526/245 |
| 3,891,591 | 6/1975 | Chang et al. | 260/29.6 WB |
| 3,919,183 | 11/1975 | Jäger et al. | 526/245 |
| 3,920,614 | 11/1975 | Kirimoto et al. | 260/63 UY |
| 3,959,462 | 5/1976 | Parks et al. | 424/70 |
| 3,972,998 | 8/1976 | Keimer | 424/70 |
| 3,997,507 | 12/1976 | Kirimoto et al. | 526/245 |
| 4,013,627 | 3/1977 | Temple | 526/245 |

FOREIGN PATENT DOCUMENTS 6,801,885 4/1968 Netherlands.

*Primary Examiner*—Harry Wong, Jr.

[57] ABSTRACT

Terpolymers comprising (i) from 55 to 80 percent by weight of units derived from a perfluoroaliphatic acrylate or methacrylate monomer, (ii) from 15 to 35 percent by weight of units derived from a nonfluorinated polyethylene oxide acrylate or methacrylate monomer, and (iii) from 1 to 15 percent by weight of units derived from a nonfluorinated dialkylaminoethyl acrylate or methacrylate monomer in its free base, amine salt, quaternary ammonium, or amine oxide form. The terpolymers are useful in oil and water repellency applications.

13 Claims, No Drawings

FLUORINE-CONTAINING TERPOLYMERS

BACKGROUND OF THE INVENTION

This invention relates to fluorine-containing oil- and water-repellent terpolymers.

Fluorine-containing polymers are known which impart oil and water repellency to substrates such as fabric and paper. There is nothing in the art, however, that teaches the terpolymers of this invention. The instant terpolymers have excellent oil and water repellency properties as well as unique aqueous and organic solubility properties. The terpolymers are particularly useful for treating substrates where mild drying conditions are desirable, such as woolen apparel, upholstery fabrics and leather.

SUMMARY OF THE INVENTION

This invention concerns terpolymers comprising (i) from 55 to 80 percent by weight of units derived from a perfluoroaliphatic monomer of the formula $$R_fQO_2CC(R)=CH_2$$

wherein
$R_f$ is a straight or branched-chain perfluoroalkyl group containing from 2 to 20 carbon atoms,
R is H or $CH_3$,
Q is alkylene of 1 to 15 carbon atoms, hydroxyalkylene of 3 to 15 carbon atoms, $-C_nH_{2n}(OC_qH_{2q})_m-$, $-SO_2NR^1(C_nH_{2n})-$, or $-CONR^1(C_nH_{2n})-$,
$R^1$ is H or $C_{1-4}$alkyl,
n is 1 to 15,
q is 2 to 4, and
m is 1 to 15;

(ii) from 15 to 35 percent by weight of units derived from a nonfluorinated polyethylene oxide acrylate or methacrylate monomer of the formula $$R^2(OCH_2CH_2)_pO_2CC(R)=CH_2$$

wherein
$R^2$ is $C_{1-18}$ alkyl, aryl or $C_{7-24}$ alkaryl,
R is H or $CH_3$,
p is 10 to 50; and (iii) from 1 to 15 percent by weight of units derived from a nonfluorinated monomer selected from the group $$CH_2=C(R)CO_2CH_2CH_2NR^3R^4,$$

$$(CH_2=C(R)CO_2CH_2CH_2{}^+NR^3R^4R^5)_yX^{-y},$$

and $$CH_2=C(R)CO_2CH_2CH_2NR^3R^4(O)$$

wherein
R is H or $CH_3$,
$R^3$ and $R^4$ are $C_{1-4}$alkyl,
$R^5$ is H or $C_{1-4}$alkyl, and
X is an anion of valence y.

The terpolymers described hereinabove are prepared from the essential monomers defined in (i), (ii) and (iii) by known solvent polymerization techniques. Weight percentages of the various terpolymer components and solution ingredients are approximate. Terpolymers deviating slightly in component percentages from those described specifically herein are included provided utility is not adversely affected.

Preferred weight ratios of the components of the terpolymer of this invention, based on total weight of the terpolymer, are: (i) 68 to 78 weight percent, (ii) 18 to 25 weight percent, (iii) 3 to 8 weight percent. A particularly preferred terpolymer of this invention comprises 75 weight percent of monomer (i) $R_fCH_2CH_2O_2CC(CH_3)=CH_2$ wherein $R_f$ is perfluoroalkyl of 4 to 14 carbon atoms, 20 weight percent of a monomer (ii) p—$C_9H_{19}C_6H_4(OCH_2CH_2)_{37}O_2CC(CH_3)=CH_2$ and 5 weight percent of a monomer (iii) $CH_2=C(CH_3)CO_2CH_2CH_2N(C_2H_5)_2(O)$.

DETAILS OF THE INVENTION

The fluorinated monomers of $R_fQO_2CC(R)=CH_2$(i) are $R_f$-alkylene—$O_2CC(R)=CH_2$, as disclosed in U.S. Pat. Nos. 2,642,416, 3,384,627, 3,392,046, 3,282,905, 3,532,659 and 3,102,103; $R_f$(hydroxyalkylene)$O_2CC(R)=CH_2$ is disclosed in U.S. Pat. No. 3,514,420; $R_fC_nH_{2n}(OC_qH_{2q})_mO_2CC(R)=CH_2$ as disclosed in British Patent 1,243,106; $R_fSO_2NR^1(C_nH_{2n})O_2CC(R)=CH_2$ is disclosed in U.S. Pat. No. 2,803,615; and $R_fCONR^1(C_nH_{2n})-O_2CC(R)=CH_2$ as disclosed in U.S. Pat. Nos. 3,304,278 and 3,578,487.

A particularly preferred monomer (i) has the formula $R_fCH_2CH_2OCOC(R)=CH_2$, wherein $R_f$ and R are as defined. Such monomers are known and can be prepared by either esterification of the appropriate alcohol, $R_fCH_2CH_2OH$, with acrylic acid or methacrylic acid or by transesterification with methylacrylate or methylmethacrylate, for example, as described in U.S. Pat. No. 3,282,905. The methacrylate esters are preferred over the acrylate esters. The perfluoroalkyl group, $R_f$, can be either straight or branched chain, with the former being preferred. The monomers, $R_fCH_2CH_2OCOC(R)=CH_2$, can contain a single perfluoroalkyl group, for example, perfluorooctyl, or a mixture of perfluoroalkyl groups. The alcohols, $R_fCH_2CH_2OH$, are commercially available as mixtures wherein $R_f$ contains about 4 to 14 carbon atoms, predominantly six and eight carbon atoms. Monomers prepared from such alcohol mixtures are preferred.

The most preferred perfluoroaliphatic monomer (i) is that wherein R is $CH_3$ and $R_f$ is a mixture of perfluoroalkyl groups, $CF_3CF_2(CF_2)_r-$, wherein r is 2, 4, 6, 8, 10 and 12 in the approximate weight ratio of 2/35/30/18/8/3; such a monomer has a weight average molecular weight of 522. The corresponding acrylate monomer has a weight average molecular weight of 508.

The nonfluorinated polyethylene oxide-containing monomer (ii) has a weight average molecular weight of the polyoxyethylene chain from about 440 to 2200. The monomer is prepared by esterification of the appropriate ethoxylated alcohol, $R^2(OCH_2CH_2)_pOH$, with acrylic or methacrylic acid by conventional procedures. The methacrylate esters are preferred over the acrylate. A particularly preferred polyoxyethylene methacrylate monomer (ii) is that obtained by esterification of methacrylic acid with the reaction product of nonylphenol and 37 moles of ethylene oxide. Alcohols such as octylphenol, stearyl alcohol, dodecyl alcohol, octyl alcohol, methanol and the like can be used in place of nonylphenol.

The third essential monomer (iii) used in the terpolymer of this invention is dialkylaminoethyl acrylate or methacrylate monomer as either the free base, amine salt, quaternary ammonium or amine oxide form. The preferred quaternary ammonium monomer is:

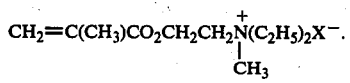

The preferred amine salt monomer is:

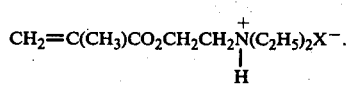

The preferred amine oxide monomer is:

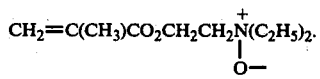

The basic dialkylaminoethyl acrylate or methacrylate monomers operable herein are known in the art and can be prepared by either reacting a tertiary amine alcohol of the formula, $HOC_2H_4NR^3R^4$, with acrylic or methacrylic acid or by transesterification with methylacrylate or methylmethacrylate. The quaternary ammonium monomers are prepared by reacting the resulting esters with a di-(lower alkyl)sulfate or a lower alkyl halide. Dimethyl sulfate and diethyl sulfate are preferred quaternizing agents. The amine salt monomers are prepared by reacting the aforesaid esters with an organic or inorganic acid, such as hydrochloric, hydrobromic, sulfuric or, preferably, acetic acid.

The amine oxide monomers are prepared by reaction of the aforesaid acrylate or methacrylate esters with conventional oxidizing agents such as hydrogen peroxide or peracetic acid and the like. Peracetic acid is a preferred oxidizing agent.

The nature of the anion, $X^\theta$, in the quaternary ammonium and amine salt monomer is, in general, determined by the method of synthesis. Usually $X^\theta$ is a halide ion, such as chloride, bromide or iodide or an acetate ion, or an alkyl sulfate ion. It is known, however, that quaternary ammonium salts can also be prepared by reacting a tertiary amine with an alkyl ester of benzene or toluenesulfonic acid; in such event, $X^\theta$ is a benzenesulfonate or a toluenesulfonate anion. In all cases, the anion, $X^\theta$, will be water-solubilizing.

The terpolymer of the invention is obtained by polymerizing essential monomers (i), (ii) and (iii) using conventional solvent polymerization techniques. Any of the conventional neutral solvents such as ethyl acetate, acetone, ethanol and, in particular, isopropanol can be used. The resulting terpolymers can, if desired, be isolated readily by evaporation of the solvent.

Alternatively, and preferably, the tertiary amine groups in the diethylaminoethyl acrylate or methacrylate monomer (iii) are converted into the amine salt, quaternary ammonium or amine oxide form after polymerization by acidification, quaternization or oxidation as described hereinabove.

Any conventional free-radical catalyst which is soluble in the solvent system can be used. Particularly preferred are azo compounds such as azobisisobutyronitrile and peroxides such as t-butyl hydroperoxide. Catalyst concentration is suitably within the range of 0.1 to 2% based on the weight of the charge.

Conventional chain transfer agents, such as dodecylmercaptan and isooctyl thioglycolate can be used in amounts of 0.1 to 2 percent by weight of the monomer to control the molecular weight of the polymer.

The terpolymer solutions prepared as described above are usually more concentrated than needed or desired for application to the substrate and may be diluted to the desired concentration using the polymerization solvent and/or water.

UTILITY

The terpolymers of this invention are useful to impart oil, water, and soil repellency to a wide range of substrates. Due to their unique combination of aqueous and organic solubility and repellency properties, the terpolymers of this invention are particularly suitable for treating substrates such as woolen apparel, upholstered furniture, delicate fenestration fabrics and leather, where mild drying conditions are desirable.

Fluorinated copolymers are known in the art, e.g., in U.S. Pat. No. 3,637,614, which have excellent water and oil repellency when used in treating textile fabrics. Use of solutions of such copolymers in quick-drying chlorinated and fluorinated solvents such as trichloroethylene, trichlorotrifluoroethane, and difluorotetrachloroethane avoids exposure of delicate substrates to levels of heat which are harmful to the substrates. However, use of such solvents is sometimes commercially unattractive. Halogenated solvents are not necessary to produce quick-drying solutions of the terpolymers of this invention which are also characterized by excellent water and oil repellency.

The terpolymers of this invention are applied to fabric, such as polyester fabric, from alcohol or aqueous-alcohol solution by conventional means such as by spraying, dipping, padding or roller-coating to provide a treated fabric which, after drying, has excellent resistance to oily and aqueous stains.

Eight parts of 100% woven polyester fabric was immersed in a solution of 0.1 part of the terpolymer solids prepared in Example 1 dissolved in 20 ml of absolute ethanol. The treated fabric was air-dried and then oven-dried for 3 minutes at 80° C. and then tested for oil and water repellency. Oil repellency was determined using AATCC Standard Test Method 118-1972 of the American Association of Textile Chemists and Colorists. This test comprised placing a drop of one of eight test solutions carefully on the fabric on a flat horizontal surface. The nature of the test solutions was as follows:

| Oil Repellency Rating | Test Solution | Surface Tension, dynes/cm at 25° C |
|---|---|---|
| 8 | n-Heptane | 20.0 |
| 7 | n-Octane | 21.8 |
| 6 | n-Decane | 23.5 |
| 5 | n-Dodecane | 25.0 |
| 4 | n-Tetradecane | 26.7 |
| 3 | n-Hexadecane | 27.3 |
| 2 | 65/35 hexadecane-"Nujol" | 29.6 |
| 1 | "Nujol" (purified petroleum oil) | 31.2 |

After 30 seconds any penetration or wicking into the fabric was noted visually. Treated fabrics with a rating of five or greater are good or excellent; anything with a rating of one or over can be used for certain purposes. As an example, if a treated fabric repels the Nos. 1-6 solutions but not the number 7 solution, its rating is 6.

Water repellency of the treated fabric was determined by carefully placing a drop of one of five test solutions on each of three locations at least two inches apart. The nature of the test solutions was as follows:

| Water Repellency Rating | Test Solution |
|---|---|
| 5 | 30/70 isopropanol-water |
| 4 | 20/80 isopropanol-water |
| 3 | 10/90 isopropanol-water |
| 2 | 5/95 isopropanol-water |
| 1 | 2/98 isopropanol-water |

If, after ten seconds, two of the three drops of the lowest numbered test solution were still visible as spherical or hemispherical, drops of the next higher numbered test solution were placed on an adjacent site and observed for ten seconds. This procedure was continued until one of the test solutions results in two of the three drops failing to remain spherical or hemispherical. The water repellency rating of the fabric corresponded to the highest numbered test solution for which two of the three drops remained spherical or hemispherical for at least ten seconds. The higher the water repellency rating, the better the resistance to staining by water-based substances.

The polyester fabric treated with the terpolymer of Example 1 rated very high on both repellency scales exhibiting a 6 oil repellency rating and a 4 to 5 water repellency rating.

The following examples illustrate the invention. Unless otherwise indicated, all parts and percentages are by weight. The percent by weight of monomer units in the terpolymers is based on the weights of monomers charged.

EXAMPLE 1

A vessel was charged with 4939 parts of a fluorinated monomer (i) having the formula $$CF_3CF_2(CF_2)_rC_2H_4O_2CC(CH_3)=CH_2$$

wherein $r$ is 2, 4, 6, 8, 10 and 12 in the respective relative amounts of 2:35:30:18:8:3 as determined by gas phase chromatographic analysis, said monomer having a weight average molecular weight of 522. The vessel was also charged with 1317 parts of a polyoxyethylene methacrylate monomer (ii) having the formula

$$C_9H_{19}-\langle O \rangle-(OC_2H_4)_{37}O_2CC(CH_3)=CH_2.$$

The vessel was also charged with 329 parts of non-fluorinated monomer (iii) of the formula, $$CH_2=C(CH_3)CO_2CH_2CH_2N(C_2H_5)_2,$$

and 11,176 parts of isopropyl alcohol. The charge was stirred at room temperature under a nitrogen atmosphere. Peracetic acid (40%, 439 parts) was then added and the charge was heated to 60° C. over 30 minutes and then stirred at 60° C. for 1 hour. Isooctyl thioglycolate (63.8 parts) and 263 parts of distilled water were then added. The monomer mixture was heated to 84° C. over 1.5 hours and then refluxed for 40 minutes. Azobisisobutyronitrile (79.1 parts) was then added to initiate polymerization and the charge was stirred for 17 hours at 78° to 83° C. under nitrogen. Distilled water (6810 parts) was added and the charge was heated to 58° C. and then filtered to yield 24,834 parts of terpolymer solution. The polymer solids (24.7%) in this solution contained 75 percent of perfluoroalkylethylmethacrylate monomer units (i); 20 percent of polyethoxylated nonylphenol methacrylate units (ii); and 5 percent of N,N-diethylaminoethylmethacrylate amine oxide units (iii).

EXAMPLE 2

Example 1 was repeated using 60 parts of the fluorinated monomer, 32 parts of the polyethoxylated nonylphenol methacrylate monomer, 8 parts of N,N-diethylaminoethyl methacrylate and 155 parts of isopropyl alcohol. Peracetic acid (40%, 9 parts) was added and the monomer mixture was stirred at 60° C. for 1 hour. Isooctyl thioglycolate (0.23 parts) and 1 part of azobisisobutyronitrile were added and the mixture was refluxed for 18 hours to complete the polymerization. A total of 261 parts of terpolymer solution was obtained. The polymer solids (36.3%) contained 60 percent of perfluoroalkylethyl methacrylate units, 32 percent of polyethoxylated nonylphenol methacrylate units and 8 percent of N,N-diethylaminoethylmethacrylate amine oxide units.

EXAMPLES 3 to 10

A series of terpolymers was made by polymerizing a fluorinated monomer, 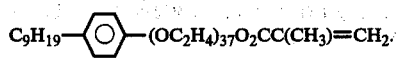 $CF_3CF_2(CF_2)_rC_2H_4O_2CC(CH_3)=CH_2$, wherein $r$ is 2, 4, 6, 8, 10 and 12, a nonylphenol methacrylate monomer containing 37 units of ethylene oxide and a N,N-diethylaminoethylmethacrylate monomer using the general procedure of Example 1. In Examples 3 to 8, the polymerization solvent was a 75:25 mixture of ethyl alcohol and water. Examples 9 and 10 used isopropyl alcohol as the solvent. The chain transfer agent and the initiator employed were isooctylthioglycolate and azobisisobutyronitrile, respectively. After polymerization, 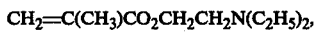 the diethylaminoethylmethacrylate units in the terpolymer were functionalized by conversion to the amine acetate salts by the addition of acetic acid (Examples 5 and 6) or to the amine oxides by the addition of peracetic acid (Examples 7 to 10).

The Table lists the percent of perfluoroalkylethylmethacrylate monomer units (i), polyethoxylated nonylphenol methacrylate monomer units (ii) and N,N-diethylaminoethylmethacrylate (DEAM) monomer units (iii) as either the free base, amine acetate or amine oxide present in the polymer solids (15%) of the resulting terpolymer solutions.

TABLE

| Example No. | Fluoro-monomer (i) | Monomer (ii) | Monomer (iii) | DEAM Function |
|---|---|---|---|---|
| 3 | 75 | 20 | 5 | Free base |
| 4 | 70 | 25 | 5 | Free base |
| 5 | 75 | 20 | 5 | Amine acetate |
| 6 | 70 | 25 | 5 | Amine acetate |
| 7 | 75 | 20 | 5 | Amine oxide |
| 8 | 70 | 25 | 5 | Amine oxide |
| 9 | 70 | 20 | 10 | Amine oxide |
| 10 | 65 | 25 | 10 | Amine oxide |

The embodiments of the invention in which an exclusive property or privilege is claimed are defined as follows:

1. A terpolymer comprising the following components:

(i) from 55 to 80 percent by weight of polymerized perfluoroaliphatic monomer of the formula $$R_fQO_2CC(R)=CH_2$$

wherein
$R_f$ is a straight or branched-chain perfluoroalkyl group containing from 2 to 20 carbon atoms,
R is H or $CH_3$
Q is alkylene of 1 to 15 carbon atoms, hydroxyalkylene of 3 to 15 carbon atoms, $-C_nH_{2n}(OC_qH_{2q})_m-$, $-SO_2NR^1(C_nH_{2n})-$ or $-CONR^1(C_nH_{2n})-$,
$R^1$ is H or $C_{1-4}$alkyl,
n is 1 to 15,
q is 2 to 4, and
m is 1 to 15;
(ii) from 15 to 35 percent by weight of polymerized nonfluorinated polyethylene oxide acrylate or methacrylate monomer of the formula $$R^2(OCH_2CH_2)_pO_2CC(R)=CH_2$$

wherein
$R^2$ is $C_{1-18}$alkyl, aryl or alkaryl containing 7 to 24 carbon atoms,
R is H or $CH_3$,
p is 10 to 50; and
(iii) from 1 to 15 percent by weight of polymerized nonfluorinated monomer selected from the group $$CH_2=C(R)CO_2CH_2CH_2NR^3R^4,$$

$$(CH_2=C(R)CO_2CH_2CH_2{}^+NR^3R^4R^5)_yX^{-y},$$

and $$CH_2=C(R)CO_2CH_2CH_2\overset{+}{N}R^3R^4$$
$$\underset{O-}{|}$$

wherein
R is H or $CH_3$,
$R^3$ and $R^4$ are $C_{1-4}$alkyl,
$R^5$ is H or $C_{1-4}$alkyl, and
X is an anion of valence y.

2. A terpolymer according to claim 1 wherein component (iii) is polymerized $$CH_2=C(R)CO_2CH_2CH_2NR^3R^4$$

wherein R is H or $CH_3$, and
$R^3$ and $R^4$ are $C_{1-4}$alkyl.

3. A terpolymer according to claim 1 wherein component (iii) is polymerized $$(CH_2=C(R)CO_2CH_2CH_2{}^+NR^3R^4R^5)_yX^{-y}$$

wherein
R is H or $CH_3$,
$R^3$ and $R^4$ are $C_{1-4}$alkyl,
$R^5$ is H or $C_{1-4}$alkyl, and
X is an anion of valence y.

4. A terpolymer according to claim 1 wherein component (iii) is polymerized $$CH_2=C(R)CO_2CH_2CH_2\overset{+}{N}R^3R^4$$
$$\underset{O-}{|}$$

wherein
R is H or $CH_3$ and
$R^3$ and $R^4$ are $C_{1-4}$alkyl.

5. A terpolymer according to claim 1 wherein component (i) is present in the amount of 68 to 78 percent by weight, component (ii) is present in the amount of 18 to 25 percent by weight, and component (iii) is present in the amount of 3 to 8 percent by weight.

6. A terpolymer according to claim 2 wherein component (i) is present in the amount of 68 to 78 percent by weight, component (ii) is present in the amount of 18 to 25 percent by weight, and component (iii) is present in the amount of 3 to 8 percent by weight.

7. A terpolymer according to claim 3 wherein component (i) is present in the amount of 68 to 78 percent by weight, component (ii) is present in the amount of 18 to 25 percent by weight, and component (iii) is present in the amount of 3 to 8 percent by weight.

8. A terpolymer according to claim 4 wherein component (i) is present in the amount of 68 to 78 percent by weight, component (ii) is present in the amount of 18 to 25 percent by weight, and component (iii) is present in the amount of 3 to 8 percent by weight.

9. A terpolymer according to claim 1 wherein component (i) is present in the amount of 75 percent by weight, component (ii) is present in the amount of 20 percent by weight, and component (iii) is present in the amount of 5 percent by weight.

10. A terpolymer according to claim 2 wherein component (i) is present in the amount of 75 percent by weight, component (ii) is present in the amount of 20 percent by weight, and component (iii) is present in the amount of 5 percent by weight.

11. A terpolymer according to claim 3 wherein component (i) is present in the amount of 75 percent by weight, component (ii) is present in the amount of 20 percent by weight, and component (iii) is present in the amount of 5 percent by weight.

12. A terpolymer according to claim 4 wherein component (i) is present in the amount of 75 percent by weight, component (ii) is present in the amount of 20 percent by weight, and component (iii) is present in the amount of 5 percent by weight.

13. A terpolymer according to claim 12 wherein component (i) is polymerized $$R_fCH_2CH_2O_2CC(CH_3)=CH_2,$$

wherein component (ii) is polymerized $$p\text{-nonyl}-\!\!\left\langle\!\!\bigcirc\!\!\right\rangle\!\!-(OCH_2CH_2)_{37}O_2CC(CH_3)=CH_2$$

and wherein component (iii) is polymerized $$CH_2=C(CH_3)CO_2CH_2CH_2\overset{+}{N}(C_2H_5)_2$$
$$\underset{O-}{|}$$

wherein $R_f$ is a perfluoroalkyl group containing from 4 to 14 carbon atoms.

* * * * *